(12) United States Patent
Bacon et al.

(10) Patent No.: US 12,322,944 B2
(45) Date of Patent: Jun. 3, 2025

(54) ARMORED CABLE ASSEMBLY WITH GROUNDING PATH COMPONENT EQUIPPED ARMOR

(71) Applicant: Northern Cables Inc., Brockville (CA)

(72) Inventors: Shelley Bacon, Brockville (CA); Todd Stafford, Brockville (CA); Donald Harris, Brockville (CA)

(73) Assignee: Northern Cables Inc., Brockville (CA)

( * ) Notice: Subject to any disclaimer, the term of this patent is extended or adjusted under 35 U.S.C. 154(b) by 164 days.

(21) Appl. No.: 18/057,611

(22) Filed: Nov. 21, 2022

(65) Prior Publication Data

US 2023/0163581 A1     May 25, 2023

Related U.S. Application Data

(60) Provisional application No. 63/282,874, filed on Nov. 24, 2021.

(51) Int. Cl.
*H02G 3/04*     (2006.01)
*H01B 7/20*     (2006.01)
*H01B 13/22*    (2006.01)

(52) U.S. Cl.
CPC ............ *H02G 3/0468* (2013.01); *H01B 7/20* (2013.01); *H01B 13/22* (2013.01)

(58) Field of Classification Search
CPC .... H01B 9/02–029; H01B 7/226; H01B 7/20; H01B 7/0869; H01B 7/17; H01B 7/18; H01B 7/228; H01B 13/22; H01B 9/028; H02G 3/0468
USPC .... 174/102 R, 103, 105 SC, 106 D, 106 SC, 174/102 D W, 105 R, 110 R, 113 C, 98, 174/99 R, 102 P, 107 W
See application file for complete search history.

(56) References Cited

U.S. PATENT DOCUMENTS

| | | |
|---|---|---|
| 9,959,954 B1 | 5/2018 | Jackson et al. |
| 10,622,119 B2 | 4/2020 | Brunner et al. |
| 10,847,286 B2 | 11/2020 | Straniero et al. |
| 2010/0186987 A1* | 7/2010 | Aitken .................. H01B 9/028 174/102 R |
| 2016/0356974 A1* | 12/2016 | Bringuier ........... B23K 26/0619 |
| 2021/0183537 A1* | 6/2021 | Maioli ..................... H01B 7/26 |

\* cited by examiner

*Primary Examiner* — Roshn K Varghese
(74) *Attorney, Agent, or Firm* — McDonnell Boehnen Hulbert & Berghoff LLP

(57) ABSTRACT

An armored cable assembly with grounding path component equipped armor and a method of producing the same is provided. The armored cable includes an SZ cabled core having a binder tape wrapped conductor bundle that includes a first ground conductor. A second ground conductor is positioned outside the binder tape such that it is aligned with the longitudinal axis of the SZ cable core and contacts the interlock armor at each helical convolution.

8 Claims, 4 Drawing Sheets

ARMORED CABLE ASSEMBLY WITH GROUNDING PATH COMPONENT EQUIPPED ARMOR

CROSS-REFERENCE TO RELATED APPLICATION

The present application is a non-provisional application that claims priority to U.S. Provisional Patent Application No. 63/282,874 filed on Nov. 24, 2021, entitled "ARMORED CABLE ASSEMBLY WITH GROUNDING PATH COMPONENT EQUIPPED ARMOR," which is hereby incorporated by reference in its entirety.

FIELD

This disclosure pertains generally to metal-clad type cable and, more particularly an armored cable assembly with grounding path component equipped armor.

BACKGROUND

Unless otherwise indicated herein, the materials described in this section are not prior art to the claims in this application and are not admitted to be prior art by inclusion in this section.

Armored cable is a widely used in wiring buildings and includes a metal sheath enclosing one or more individually insulated conductors. The sheath may be formed of a helically interlocked continuous strip of metal, or of smooth or corrugated continuous metal tubing. The construction of an armored cable sheath is well known in the art.

In some applications, including health care, the armored cable includes two ground conductors. Generally, at least one ground conductor is assembled together with the other conductors and bound together with binder tape. U.S. Pat. No. 9,959,954B1 discloses an armoured cable where a second ground conductor is located outside the binder tape between the valleys of conductors within the binder tape so that the second ground conductor makes contact with the interlocking armor at regular intervals over its full length such that the armoring acts as a ground component.

There remains a continuing need to provide improved armored cable that has improved grounding performance and for a method of producing the improved armored cable in a cost-efficient manner.

SUMMARY

An object of the present disclosure is to provide an armored cable assembly with a grounding path component equipped armor. In accordance with an aspect of the present disclosure, there is provided an armored cable comprising: a SZ cabled core comprising a conductor bundle wrapped in binder tape, the conductor bundle comprising a first ground conductor and a plurality of conductors, wherein cable lay direction of the SZ cable core changes at intervals along its full length; a second ground conductor positioned outside the binder tape such that the second ground conductor is aligned with the longitudinal axis of the SZ cable core; and an interlock armor formed from interlocked helical convolutions of a metallic strip disposed over the SZ cabled core and the second ground conductor such that the second ground conductor contacts the interlock armor at each helical convolution.

In accordance with another aspect of the disclosure there is provided a method of assembling an armored cable, the method comprising: twisting a first ground conductor, a phase conductor and a neutral conductor adjacent to each other to form a cabled core, wrapping a binder tape around the cabled core; positioning a second ground conductor outside the binder tape of the cabled core such that the second ground conductor is aligned with the longitudinal axis of the cable core; and covering the SZ cabled core and the second ground conductor with an interlock armor such that the second ground conductor contacts the interlock armor at each helical convolution of the interlock armor.

BRIEF DESCRIPTION OF THE DRAWINGS

These and other features of the disclosure will become more apparent in the following detailed description in which reference is made to the appended drawings.

DETAILED DESCRIPTION

The present disclosure provides an improved armored cable (100) assembly with grounding path component equipped interlocked armor. In particular, the present disclosure provides a configuration that improves contact between the grounding path component and the interlocked armor.

Figure 1:
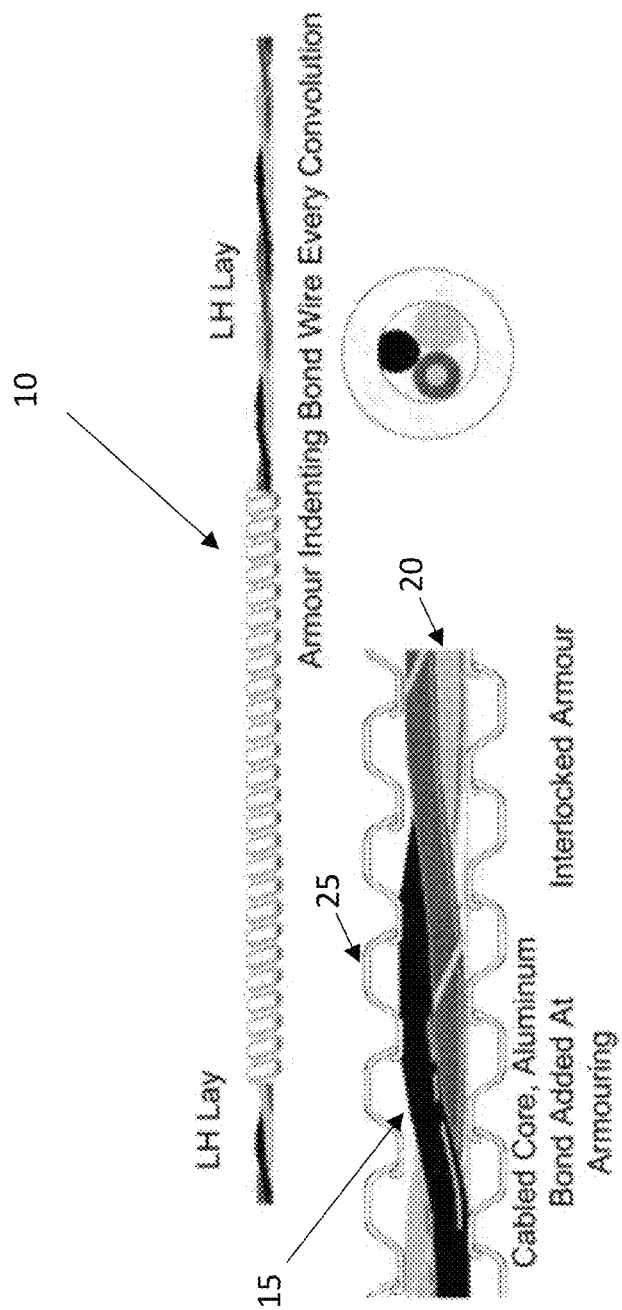
FIG. 1 is various views of the prior art armored cable assembly with a second ground located outside of the binder tape and between the valleys of the conductors. A) is a longitudinal view of an armored cable assembly with armor removed in part, (B) is a longitudinal cross-sectional view of the armored cable assembly with grounding path component equipped armor of this embodiment. (C) shows a cross-sectional view at point of contact between the ground path component and the armoring.

Prior art armored cable assembly with grounding path component equipped armor includes a second ground wire outside the binder tape that indents at every convolution. Referring to FIG. 1, in the prior art armored cable (10), the second ground conductor (15) is located between the valleys of conductors in the conductor bundle (20) such that the second ground conductor loses contact with the interlocked armor (25) at regular intervals along its path reducing its effectiveness as a back-up ground.

Figure 2:
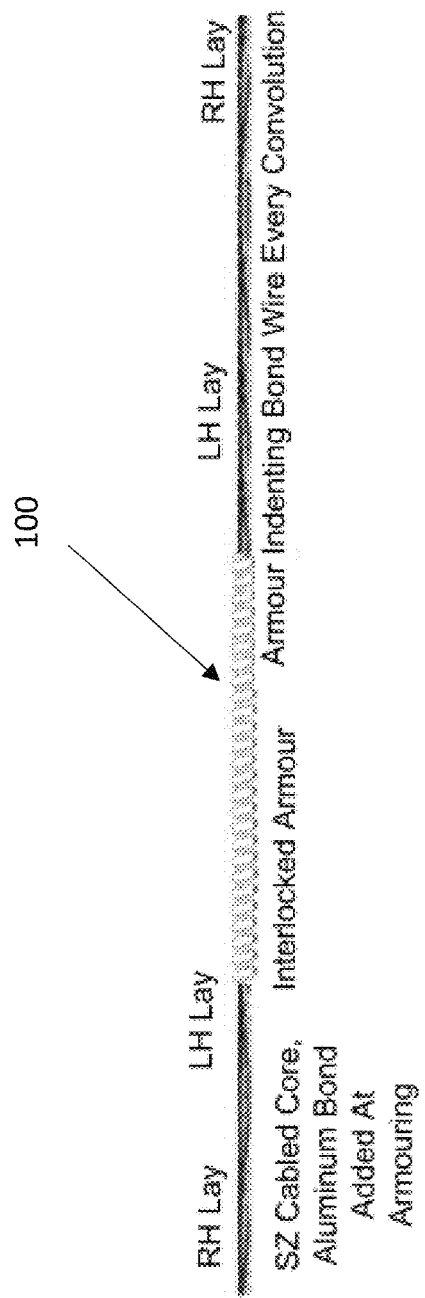
FIG. 2 is a longitudinal view of an armored cable assembly with grounding path component equipped armor with armor removed in part in accordance with one embodiment.
Figure 3:
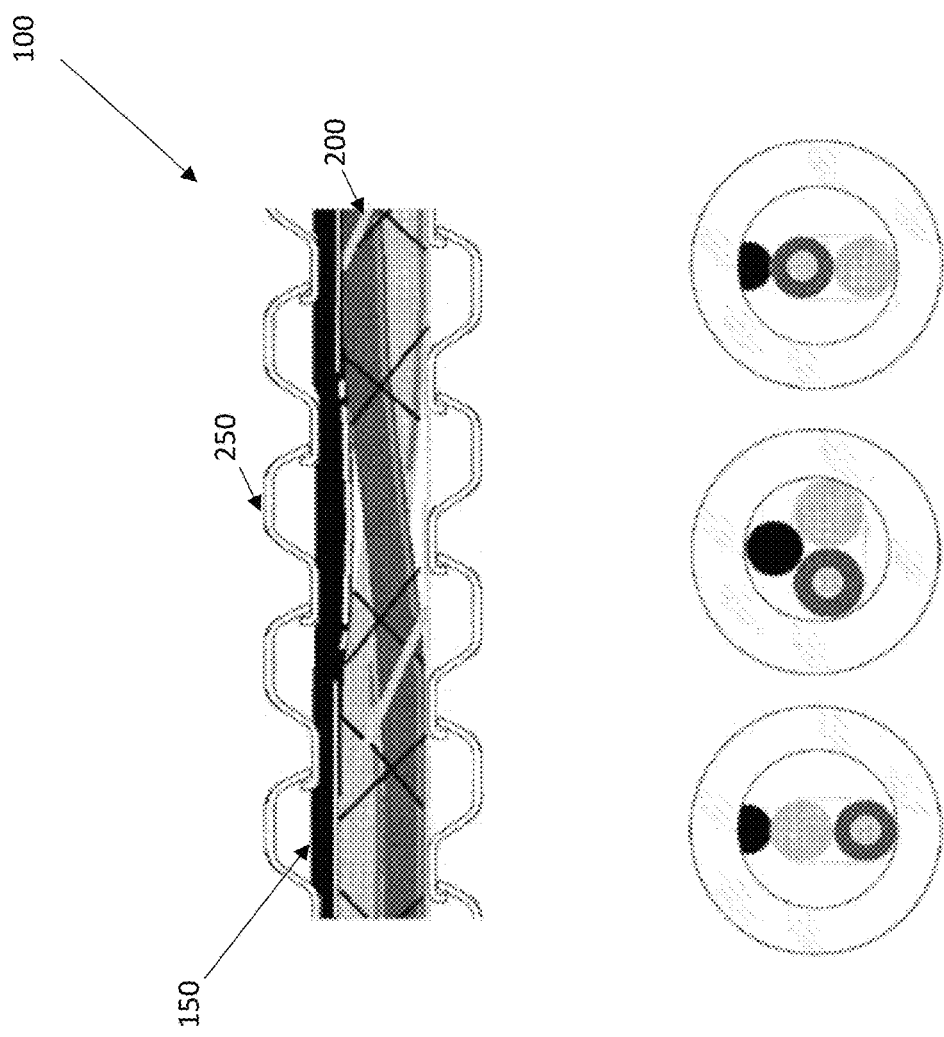
FIG. 3 is various views of the armored cable assembly with ground path component equipped armor. (A) is a longitudinal cross-sectional view of the armored cable assembly with grounding path component equipped armor of this embodiment. (B) is shows cross-sectional views at various points along its length showing the placement of the ground path component next to the armoring at all points all its length.

The improved armored cable (100) assembly with grounding path component equipped interlocked armor of the present disclosure has a second uninsulated ground conductor (150) that stands above the cable bundle (200) and directly contacts the interlocked armor (250) at each helical convolution over the entire length of the armored cable. In particular, the second ground contacts the armor at every indent along its length. Referring to FIG. 2 and FIG. 3, the grounding path component equipped armor cable includes a SZ cabled core such that the cabled core has a periodic reversal of cable lay direction.

The cable lay direction is changed at intervals along the full length of the cable. In some embodiments, the direction of cable lay is reversed at regular and optionally uniform intervals. In some embodiments, lay direction is reversed after 5.9" lay length, wherein lay length is the length required to complete one revolution of the strand around the diameter of the conductor. In other embodiments, lay direction is reversed after 6.7" lay length. A transition zone or oscillated section is provided between each section of left hand or "S" cabling and right hand or "Z" cabling.

The size and cross-sectional shape of the armored cable is dependent on the components contained therein. In some embodiments, the armored cable has a generally circular or oval cross section. In some embodiments, the diameter is about 0.535" to about 0.786". In some embodiments, the cross-sectional diameter of the armored cable is about 0.5 inches.

The SZ cable core includes insulated stranded or solid conductors together with a first insulated ground conductor. In some embodiments, a control conductor or control conductor assembly is included.

The conductors of the armored cable can be different gauge, generally ranging from #6 AWG to #18 AWG (American wire gauge) and have an oval or circular cross section.

In some embodiments, the armored cable includes of individual conductors of different sizes and materials and includes both stranded or solid conductors that are manufactured from different conducting material including copper, aluminum, nickel or a combination thereof. For example, the conductors can have a circular, oval, trapezoidal, square, rectangular, triangular, or other geometrical shape cross section.

In some embodiments, the gauge of the phase and neutral conductors is the same as the gauge of the ground conductor. In other embodiments, the gauge of the phase and neutral conductors is smaller than the gauge of the ground conductor.

In one embodiment, the phase and neutral conductors are #12 AWG and the ground conductors are #10 AWG. In a preferred embodiment, the phase and neutral conductors are #12 AWG solid copper and the ground conductors are #10 AWG aluminum.

In one embodiment, the phase and neutral conductors are #10 AWG and the ground conductors are #8 AWG Aluminum. In a preferred embodiment, the phase and neutral conductors are #10 AWG solid copper and the ground conductors are #8 AWG aluminum, solid or stranded copper phase and neutral conductors, ground conductors are solid aluminum.

In some embodiments, the first and second grounds are the same gauge. In other embodiments, the first ground has a larger gauge than the second ground.

Appropriate insulation material is known in the art and includes Thermoplastic Heat and Water-resistant Nylon (THWN), Thermoplastic High Heat-resistant Nylon (THHN) or Thermoplastic Fixture Wire Nylon (TFN), Crosslinked Polyethylene High Heat Resistant and Water Resistant (XHHW-2). As is known in the art selection of appropriate insulation material is dependent on application, required temperature rating and conditions of use. Optionally, the insulation material is color-coded and/or may include printing to allow for identification individual cables.

In one embodiment, the SZ cable core comprises a first ground conductor, a phase conductor and a neutral conductor. Optionally, the first ground conductor is a copper conductor with green color-coded insulation THHN or THWN, the phase conductor is a copper conductor with black color-coded insulation, optionally THHN or THWN and the neutral conductor is a copper conductor with white color-coded insulation, optionally THHN or THWN.

In one embodiment, the SZ cable core comprises a phase conductor, a neutral conductor as described above and further comprises a control assembly optionally comprising a first control conductor and a second control conductor each which are color coded and the #10AWG Aluminum ground conductors.

In one embodiment, the armored cable comprises 2 copper #12AWG conductors with a #10AWG solid Aluminum bond wire.

In one embodiment, the armored cable comprises 3 copper #12AWG conductors with a #10AWG solid Aluminum bond wire.

In one embodiment, the armored cable comprises 2 copper #10AWG conductors with a #8AWG solid Aluminum bond wire.

In one embodiment, the armored cable comprises 3 copper #10AWG conductors with a #8AWG solid Aluminum bond wire.

Optionally, the copper conductors are solid or stranded.

Optionally, the conductors are color coded. Appropriate colors may be dependent on application and include black, white, red, white, brown, gray, orange yellow and may include a colored stripe.

In one embodiment, the SZ cable core comprises a first ground conductor, phase conductor, a neutral conductor as described above and further comprises a control assembly optionally comprising a first control conductor and a second control conductor each which are color coded and the #10AWG Aluminum ground conductor.

In one embodiment, the armored cable comprises 2 #12 AWG solid copper conducts and a 2 #16 AM conducts with #10 AM solid Aluminum ground.

In one embodiment, the armored cable comprises 3 #12 AM solid copper conducts and a 2 #16 AWG conducts with #10 solid Aluminum ground.

In one embodiment, the armored cable comprises 2 #10 AM solid copper conducts and a 2 #16 AWG conducts with #10 AWG solid Aluminum ground.

In one embodiment, the armored cable comprises 3 #10 AWG solid copper conducts and a 2 #16 AW conducts with #10 AWG solid Aluminum ground.

The interlocking armor provides a flexible, protective sheath and is constructed from a conductive material, for example aluminum or steel, thereby providing a ground path. The armor sheath together with the second ground provides a redundant ground.

The metal armor sheath is constructed from flat or shaped metal strips generally having a thickness of about 0.010 inches to about 0.040 inches and preferably about 0.016 inches and is indented at every convolution. In some embodiments, the metal sheath armor sheath is formed from aluminum strip having a thickness of about 0.016 inches and width of about 0.375 inches.

The metal strip is helically wrapped and interlocked to form a series of "S" shaped convolutions along the length of the cable or corrugated. In some embodiments, the armor is low profile.

The interlocking armor is optionally coated, for example with a polyvinyl chloride jacket, painted or otherwise labelled. For example, in some embodiments, the interlocking armor is labelled as described in U.S. Pat. No. 10,622,119.

Figure 4:
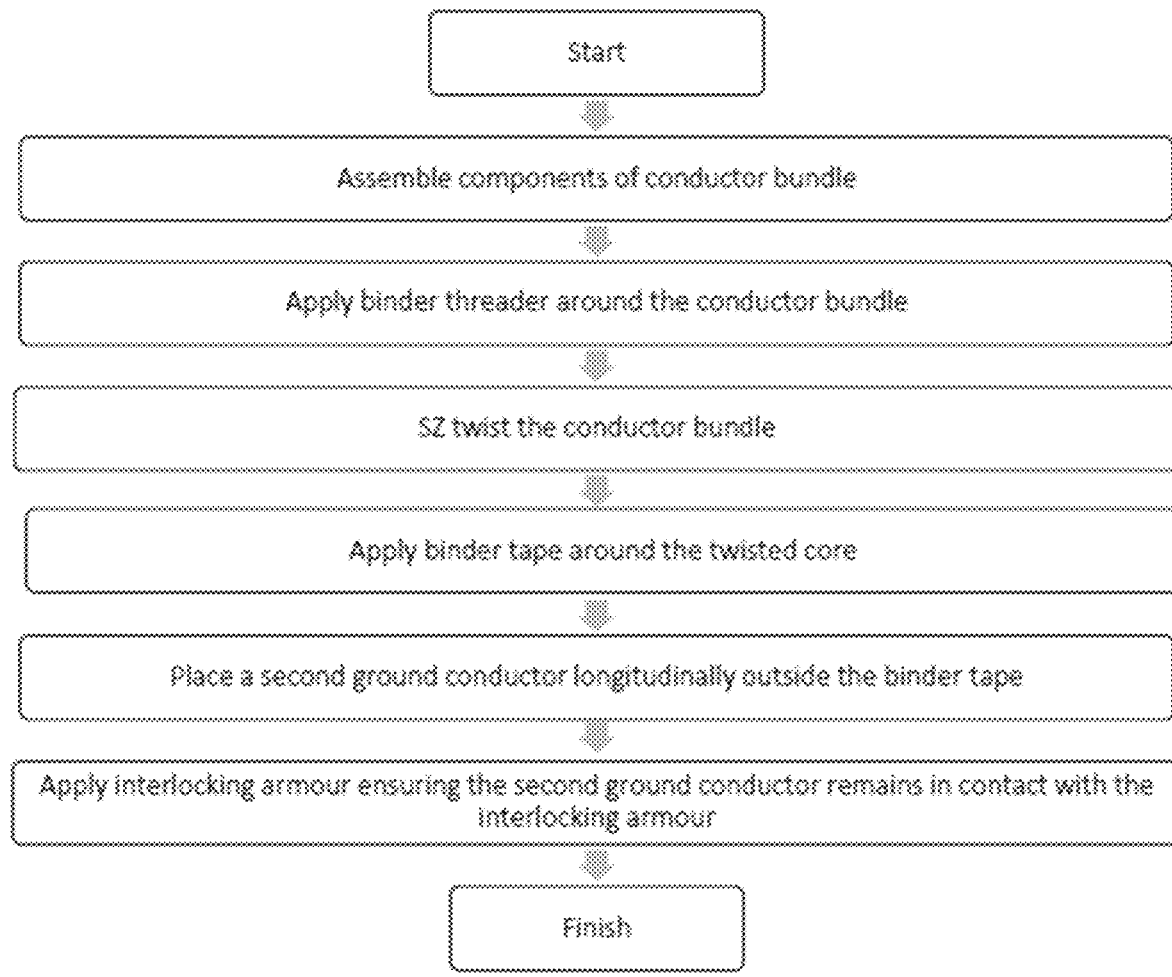
FIG. 4 is a flow chart of an exemplary manufacturing process for the cable according to one embodiment.

The disclosure further provides a method of assembling an armored cable. Referring to FIG. 4, the method comprises the step of assembling by positioning the conductors including the first ground conductor together and wrapping the bundle in binder thread. The conductor bundle is twisted with the cable lay direction changed at intervals to form a SZ cabled core and binder tape applied. The uninsulated second ground conductor is positioned above the SZ cabled core and aligned with the longitudinal axis of the SZ cable core. The SZ cabled core and the second ground conductor is covered with an interlock armor such that the second ground conductor contacts the interlock armor at each helical convolution of the interlock armor. Optionally, the armored cable is painted, labelled or coated.

Although the disclosure has been described with reference to certain specific embodiments, various modifications thereof will be apparent to those skilled in the art without departing from the spirit and scope of the disclosure. All such modifications as would be apparent to one skilled in the art are intended to be included within the scope of the following claims.

We claim:

1. An armored cable comprising:
    an SZ cabled core comprising a conductor bundle wrapped in binder tape, the conductor bundle comprising a first ground conductor and a plurality of conductors, wherein a cable lay direction of the SZ cabled core changes at intervals along its full length;
    a second ground conductor positioned outside the binder tape such that the second ground conductor stands above the SZ cabled core and is aligned with a longitudinal axis of the SZ cabled core; and
    an interlocked armor formed from interlocked helical convolutions of a metallic strip disposed over the SZ cabled core and the second ground conductor such that the second ground conductor contacts the interlock armor at each helical convolution.

2. The armored cable of claim 1, wherein the cable lay direction of the SZ cabled core changes at uniform intervals.

3. The armored cable of claim 1, wherein the second ground conductor has a diameter that is greater than the diameter of the first ground conductor.

4. The armored cable of claim 1, wherein the second ground conductor is a solid aluminum bond wire.

5. The armored cable of claim 1, wherein the plurality of conductors comprises a control conductor assembly.

6. A method of assembling an armored cable, the method comprising:
    SZ twisting a first ground conductor, a phase conductor, and a neutral conductor adjacent to each other to form an SZ cabled core, wherein a cable lay direction of the SZ cabled core changes at intervals along its full length;
    wrapping a binder tape around the SZ cabled core;
    positioning a second ground conductor outside the binder tape of the SZ cabled core such that the second ground conductor stands above the SZ cabled core and is aligned with a longitudinal axis of the SZ cabled core; and
    covering the SZ cabled core and the second ground conductor with an interlock armor such that the second ground conductor contacts the interlock armor at each helical convolution of the interlock armor.

7. The armored cable of claim 5, wherein the control conductor assembly comprises a first control conductor and a second control conductor.

8. The armored cable of claim 1, wherein:
    at a first position of the armored cable, the first ground conductor is positioned between the plurality of conductors and the second ground conductor,
    at a second position of the armored cable, the plurality of conductors is positioned between the first ground conductor and the second ground conductor, and
    at a third position of the armored cable between the first position and the second position, the second ground conductor is positioned within a valley between the first ground conductor and the plurality of conductors.

* * * * *